No. 846,485. PATENTED MAR. 12, 1907.
A. LEITCH.
KINDERGARTEN APPARATUS.
APPLICATION FILED APR. 27, 1906.

Witnesses
A. J. Madden
A. E. Hathaway

Inventor
Andrew Leitch
per. R. Madden
Attorney

UNITED STATES PATENT OFFICE.

ANDREW LEITCH, OF SUNDERLAND, ENGLAND.

KINDERGARTEN APPARATUS.

No. 846,485.

Specification of Letters Patent.

Patented March 12, 1907.

Application filed April 27, 1906. Serial No. 314,090.

*To all whom it may concern:*

Be it known that I, ANDREW LEITCH, a subject of the King of England, residing at Fulwell, Sunderland, in the county of Durham, England, have invented certain new and useful Improvements in Kindergarten Apparatus, of which the following is a specification.

This invention relates to kindergarten apparatus for use in teaching elements of arithmetic and numerical values; and it comprises a board or exhibiting-frame and certain strips to be used in conjunction therewith.

Figure 1:
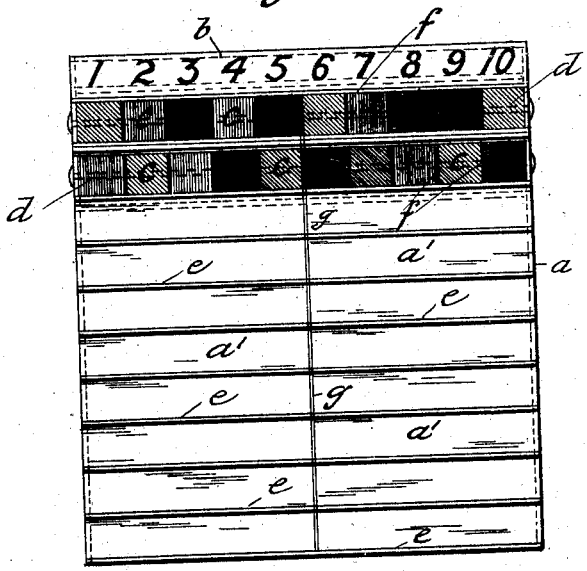
Figure 2:
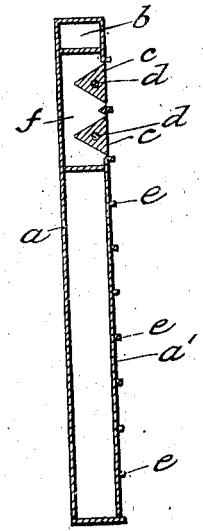
Figure 3:
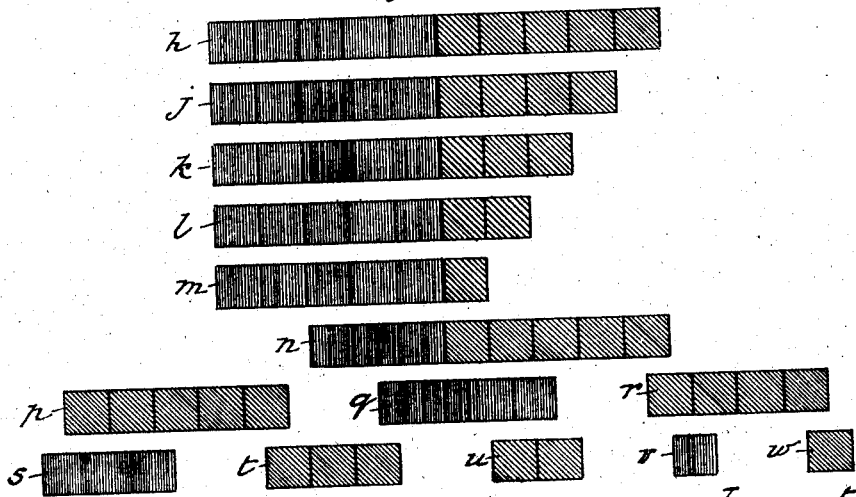

In the annexed drawing, Figure 1 is a front elevation of the board or exhibiting-frame. Fig. 2 is a vertical section thereof. Fig. 3 shows the strips.

$a$ is a frame made of any suitable material, such as wood, having at its upper end a receptacle $b$, serving as a box to receive the strips when not in use. Below the receptacle $b$ the frame contains a space divided by a plurality of vertical partitions $f$ to form ten compartments, in each of which two prisms $c$ are mounted. These prisms form two alined series carried on two rods $d\ d$, each prism being separately rotatable on its rod so as to present one or other of its three faces at the front of the frame, where openings are provided for the purpose. The faces of each prism are contrasted by use of different coloring. For example, each prism has one of its faces black and the other two red and green, respectively. Beneath the space containing the prisms $c$ the frame forms a board $a'$, on which parallel ledges $e\ e$ are fixed at distances apart equal to the width of the strips next to be described and preferably equal to the width of the faces of the prisms. The breadth of the board is preferably ten times the interval between two adjacent strips $e\ e$. The faces of the prisms are preferably squares. A vertical line $g\ g$ is drawn or painted up the middle of the board $a'$. On the space on the front of the compartment $b$ numbers "1" to "10" are painted at equal distances, as shown in Fig. 1. With this board a series of strips are used. These strips are of different lengths in multiples of one, the longest having ten divisions, as shown at $h$, Fig. 3; another, $j$, having nine divisions; others, $k\ n$, of eight divisions; another, $l$, of seven divisions; another, $m$, of six divisions; another, $p$, of five divisions; others, $q\ r$, of four divisions; others, $s\ t$, of three divisions; another, $u$, of two divisions, and others, $v\ w$, of one division. The width of each strip is equal to the width between two adjacent ledges $e\ e$. The divisions on the strips are equal to the length of the faces of the prisms. The faces of the strips are divided by vertical lines to show the divisions, and some of them are painted in two contrasting colors—for example, red and green—some of the divisions being of one color and the remainder of another color, as shown in Fig. 3, in which the cross-hatching in one direction shows one color and the vertical hatching or shading the other color. The strips may be of cardboard or thin wood. There may be more than one of each of the strips illustrated. A suitable set of instruction will preferably comprise ten strips such as $h$, ten such as $v$ or $w$, and one of each of the others.

The apparatus is intended to be used by the teachers as follows: By turning one or more of the prisms to exhibit one color in one or both rows, the rest showing their black faces, an idea of the relative values of different numbers is given. By exhibiting some in red, others in green, and subsequently changing these to one color only processes of addition may be exemplified, and by a converse process subtraction may be shown. These ideas and processes may be temporarily recorded by placing the strips on the ledges $e\ e$. Numerous methods of teaching are available by use of this apparatus alone or in conjunction with similar-marked blocks, cubes, or strips to be manipulated by the scholars.

What I claim as my invention, and desire to secure by Letters Patent of the United States, is—

1. Apparatus for teaching arithmetic comprising a frame having a compartment and an exhibiting-board and a series of independently-rotatable prisms having contrasted surfaces mounted in said compartment.

2. Apparatus for teaching arithmetic comprising a frame having a compartment and an exhibiting-board extending below said compartment, a series of independently-rotatable prisms having contrasted surfaces mounted in said compartment, ledges on said exhibiting-board and a plurality of loose strips of different surface character adapted to be placed on said ledges.

3. Apparatus for teaching arithmetic compirsing a frame having an open-fronted space, two rows of independently-rotatable prisms mounted one above the other in said space said prisms having three faces contrasted in color, and an exhibiting-board beneath said space.

4. Apparatus for teaching arithmetic comprising a frame having an open-fronted space independently-rotatable prisms in said space said prisms having three faces contrasted in color, an exhibiting-board beneath said space, transverse ledges on the face of said board, and a plurality of strips of graduated length and having surface divisions corresponding in breadth to the length of a prism said divisions being colored in groups contrasting with one another.

5. Apparatus for teaching arithmetic comprising a frame having in its upper end a box, an open-fronted space beneath said box, a plurality of vertical partitions dividing said space into equal compartments, two rows of independently-rotatable prisms mounted one above the other in said compartments said prisms having three faces contrasting in color, an exhibiting-board beneath said space transverse ledges on the face of said board and a plurality of strips of graduated length and having surface divisions corresponding in breadth to the length of a prism said divisions being colored in groups contrasting with one another.

In witness whereof I have signed this specification in the presence of two witnesses.

ANDREW LEITCH.

Witnesses:
W. H. NIXON,
MARCUS FALK.